(12) United States Patent
Takeuchi

(10) Patent No.: US 8,559,072 B2
(45) Date of Patent: Oct. 15, 2013

(54) IMAGE READING APPARATUS AND LINEAR LIGHT SOURCE UNIT

(75) Inventor: Hideo Takeuchi, Ebina (JP)

(73) Assignee: Fuji Xerox Co., Ltd., Tokyo (JP)

(*) Notice: Subject to any disclaimer, the term of this patent is extended or adjusted under 35 U.S.C. 154(b) by 702 days.

(21) Appl. No.: 12/783,657

(22) Filed: May 20, 2010

(65) Prior Publication Data
US 2011/0013237 A1    Jan. 20, 2011

(30) Foreign Application Priority Data
Jul. 17, 2009   (JP) ................. 2009-169274

(51) Int. Cl.
*H04N 1/04*    (2006.01)
(52) U.S. Cl.
USPC ........... 358/475; 358/474; 358/479; 358/484
(58) Field of Classification Search
USPC .................. 358/475, 474, 479, 484
See application file for complete search history.

(56) References Cited

U.S. PATENT DOCUMENTS

| | | | | |
|---|---|---|---|---|
| 8,194,294 B2 * | 6/2012 | Tagawa et al. | ................. | 358/475 |
| 2005/0088705 A1 | 4/2005 | Okamoto et al. | | |
| 2006/0279961 A1 * | 12/2006 | Sakurai | ......................... | 362/555 |
| 2008/0198424 A1 | 8/2008 | Higashitani | | |
| 2009/0080038 A1 | 3/2009 | Hayashide et al. | | |

FOREIGN PATENT DOCUMENTS

| | | |
|---|---|---|
| JP | 63-10864 A | 1/1988 |
| JP | 2001-36151 A | 2/2001 |
| JP | 2005-252646 A | 9/2005 |
| JP | 3139787 U | 2/2008 |
| JP | 2008-129213 A | 6/2008 |
| JP | 2008-205844 A | 9/2008 |
| JP | 2009-80173 A | 4/2009 |

OTHER PUBLICATIONS

Japanese Office Action issued in Japanese Application No. 2009-169274 dated Mar. 5, 2013.

* cited by examiner

*Primary Examiner* — Houshang Safaipour
(74) *Attorney, Agent, or Firm* — Sughrue Mion, PLLC

(57) ABSTRACT

An image reading apparatus includes: a light emitting element array that includes plural light emitting elements arranged in line in a first scan direction of a document; a guiding unit that guides light entering from the light emitting element array, and that emits the light toward a reading position of the document while diffusing the light; a light receiving unit that receives reflected light from the reading position irradiated with the light from the light emitting element array through the guiding unit; and a scan unit that moves the reading position of the document in a second scan direction, the reading position being a position read by the light receiving unit.

8 Claims, 13 Drawing Sheets

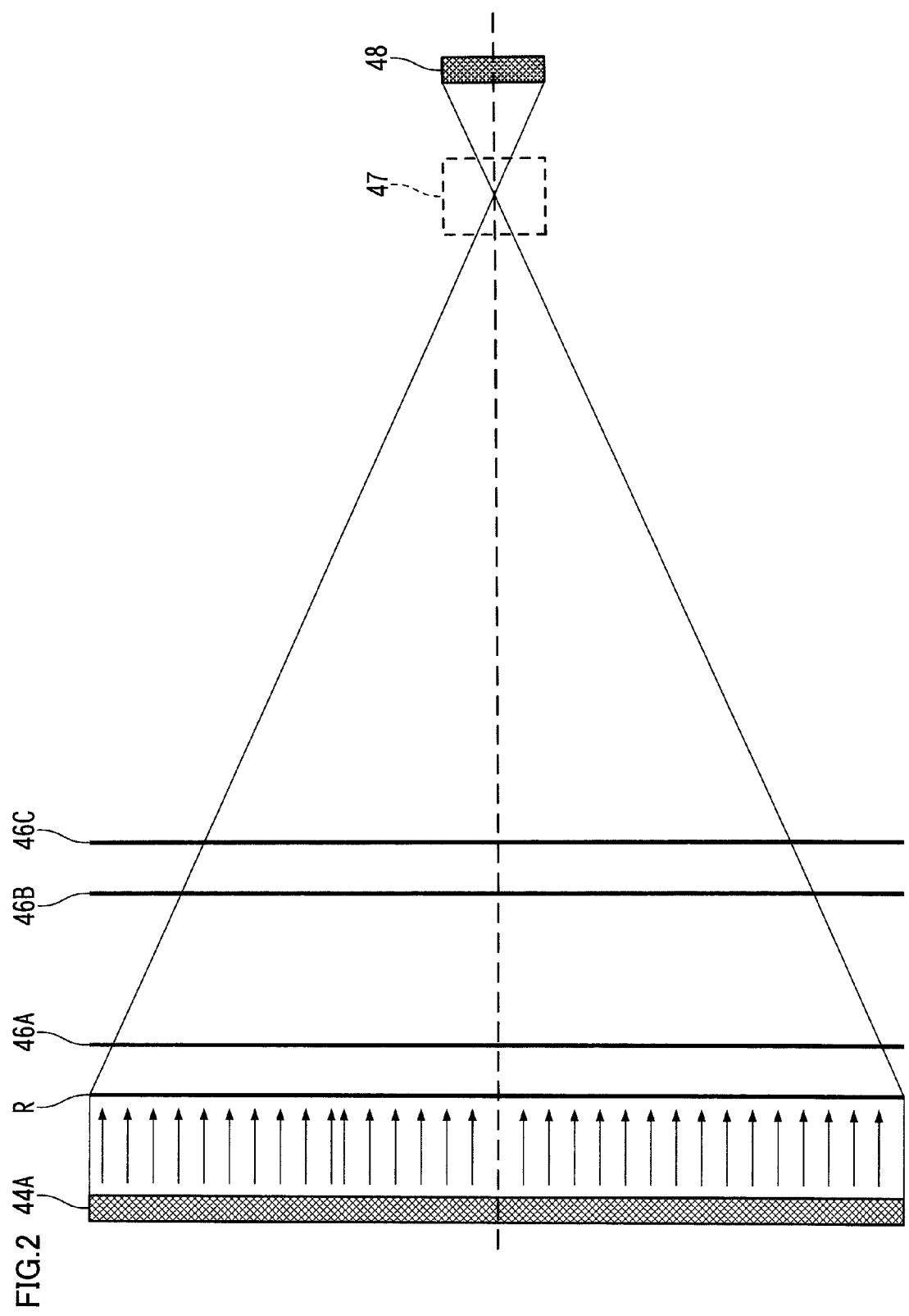

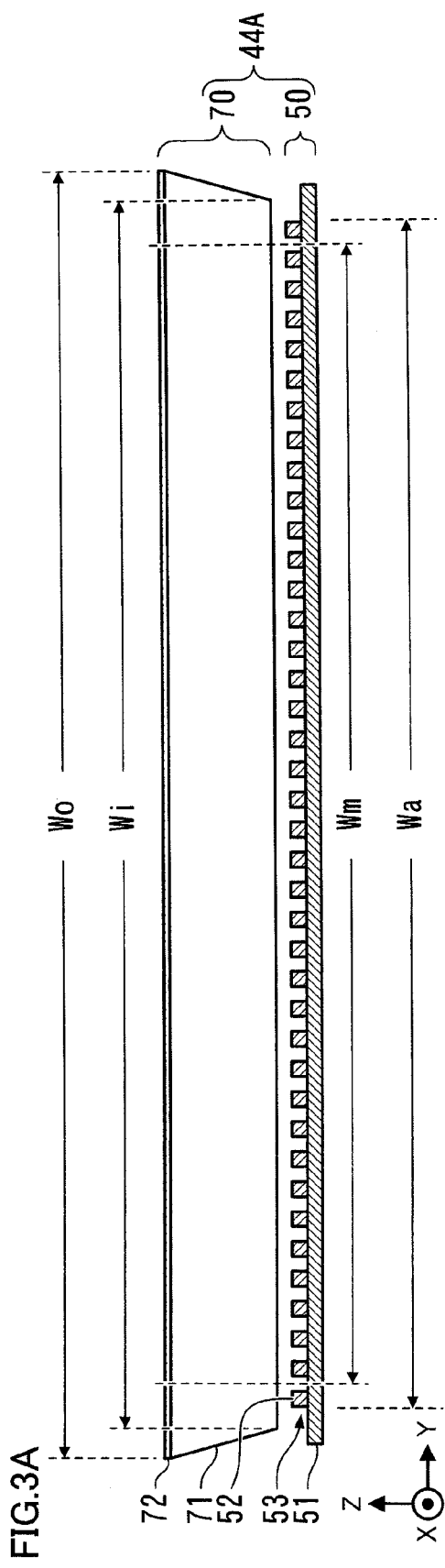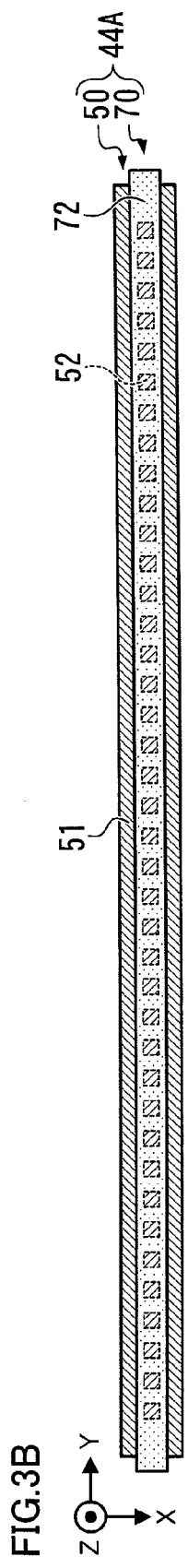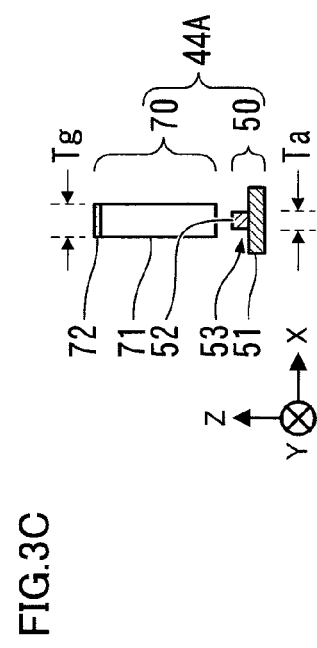
FIG.3A
FIG.3B
FIG.3C

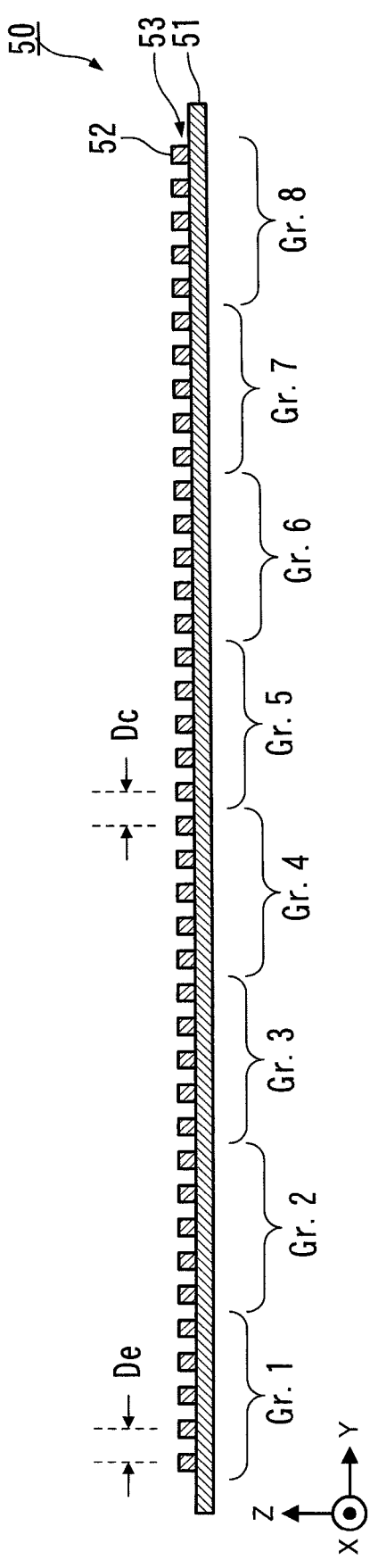
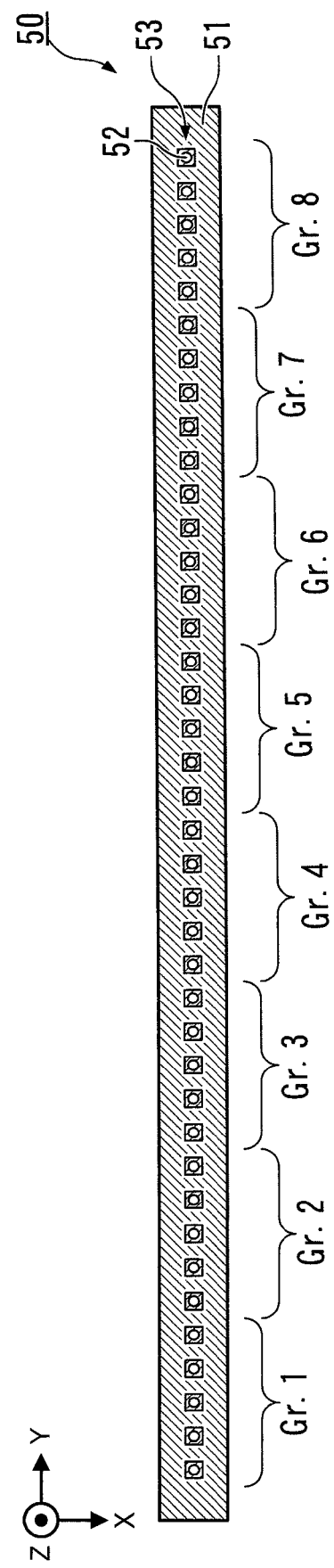
FIG.4A
FIG.4B

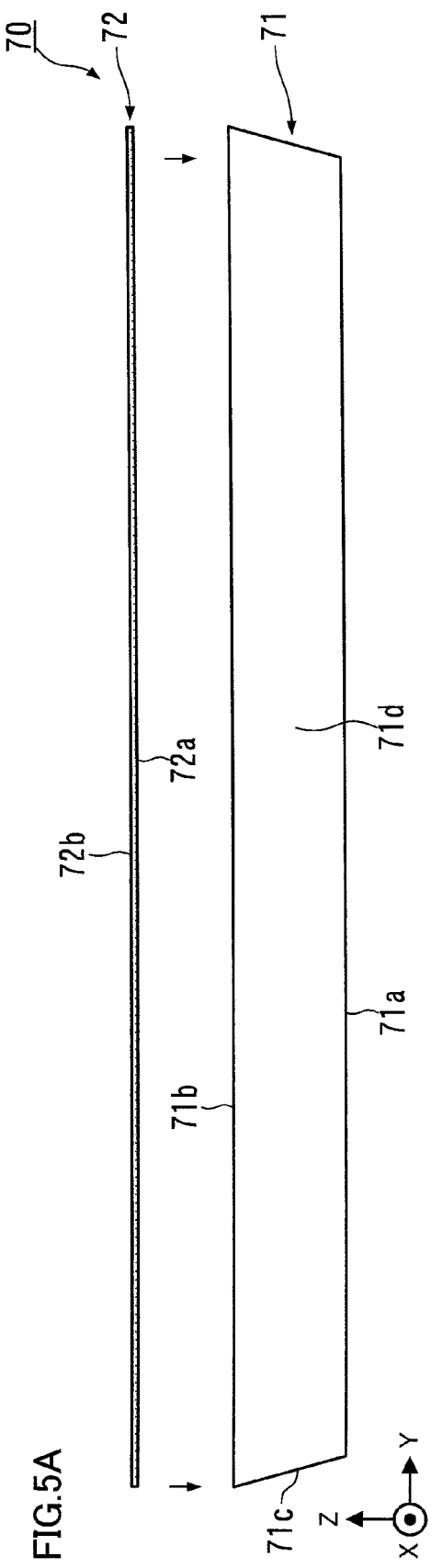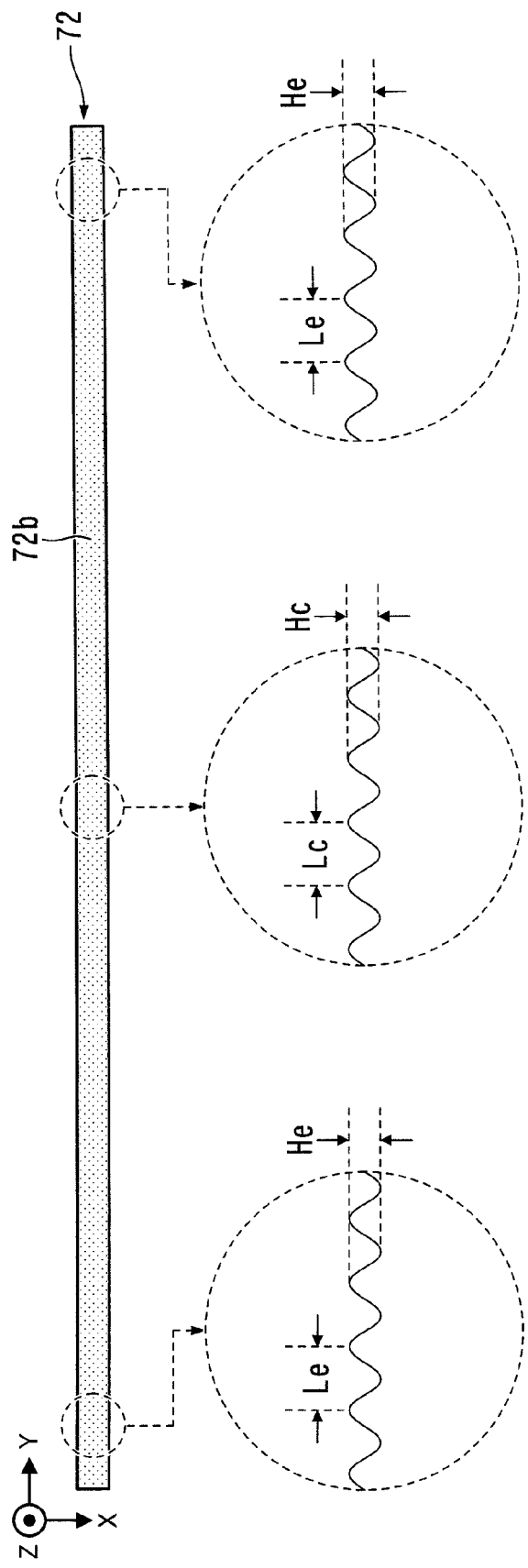

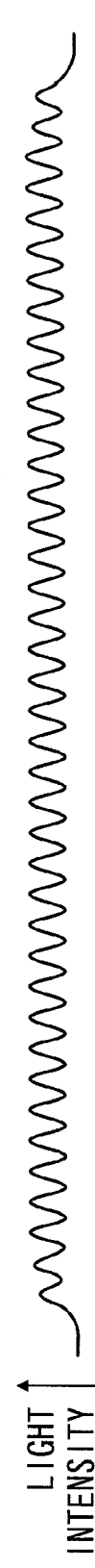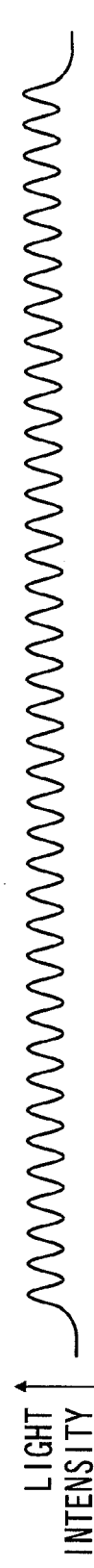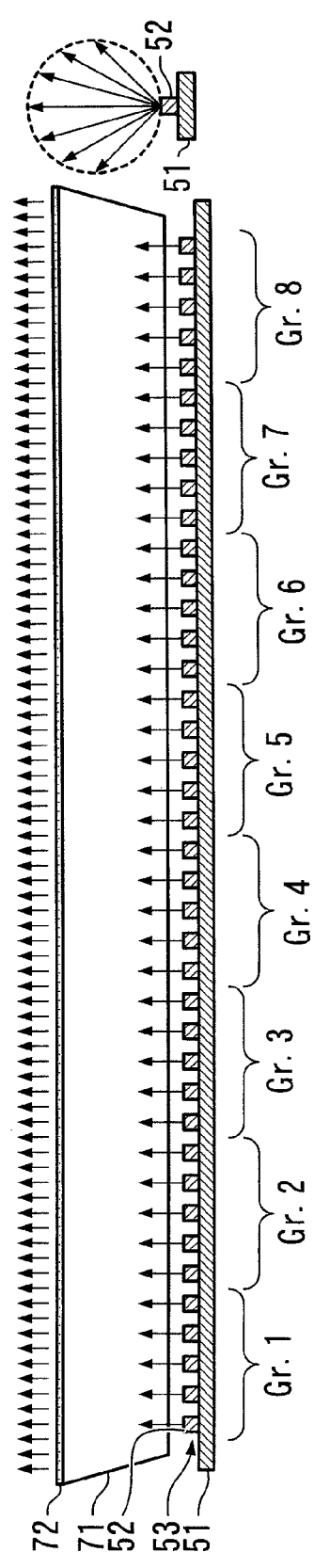

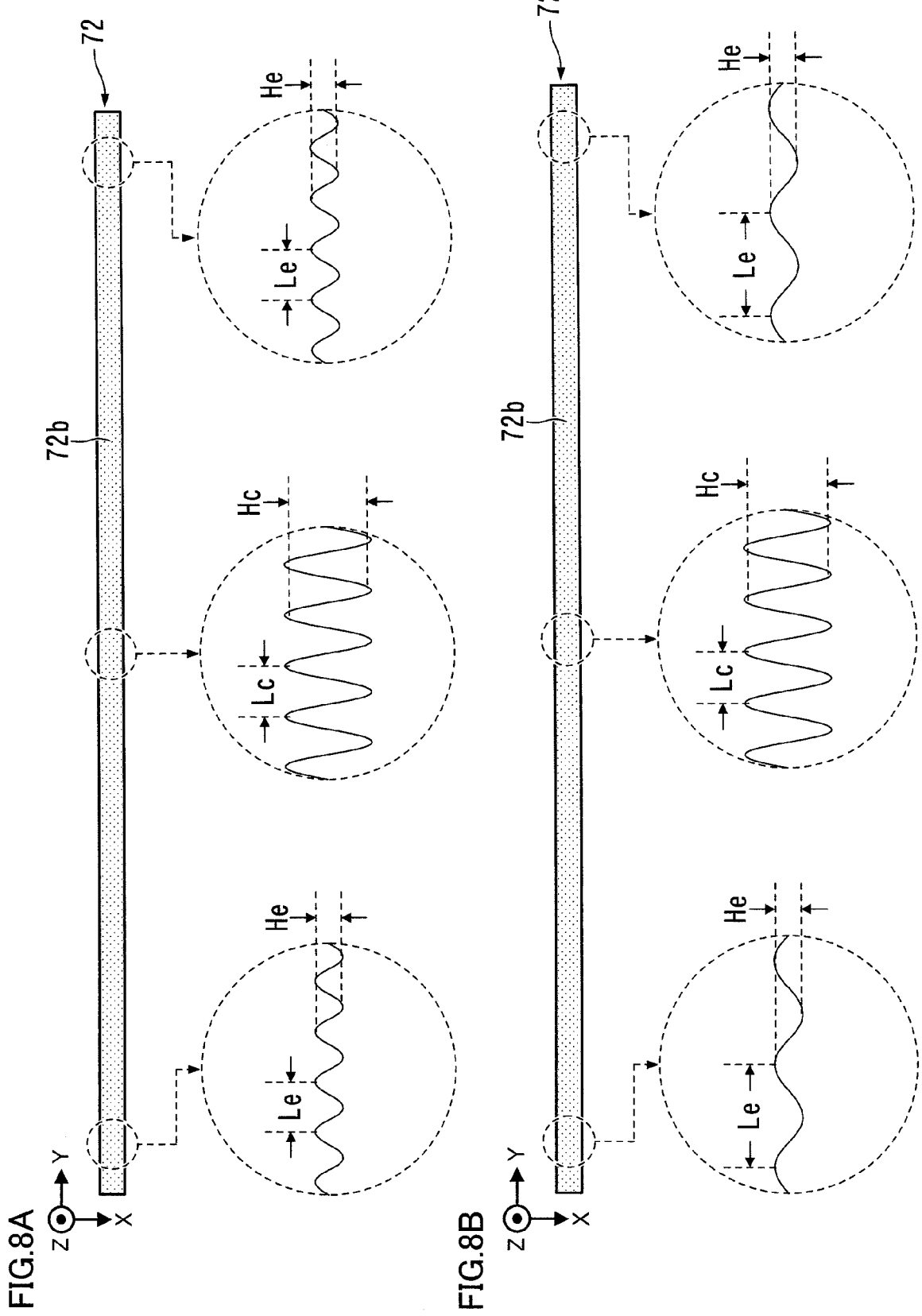

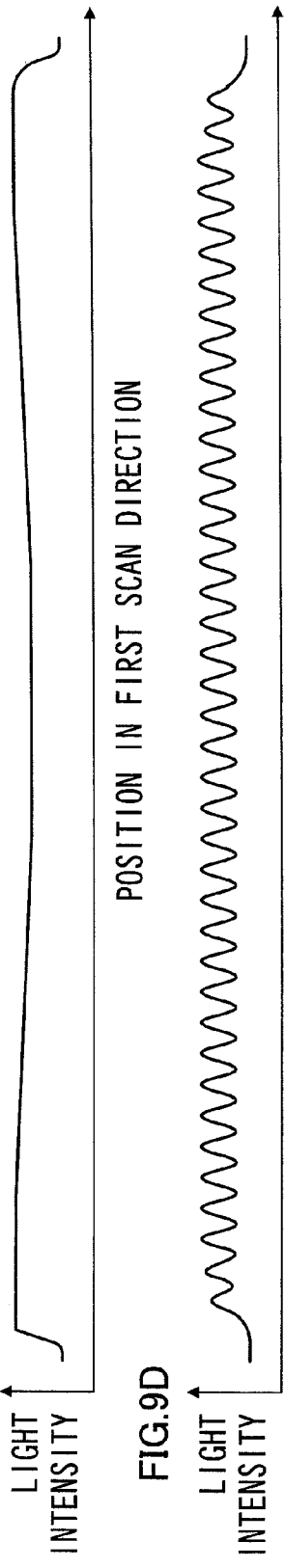
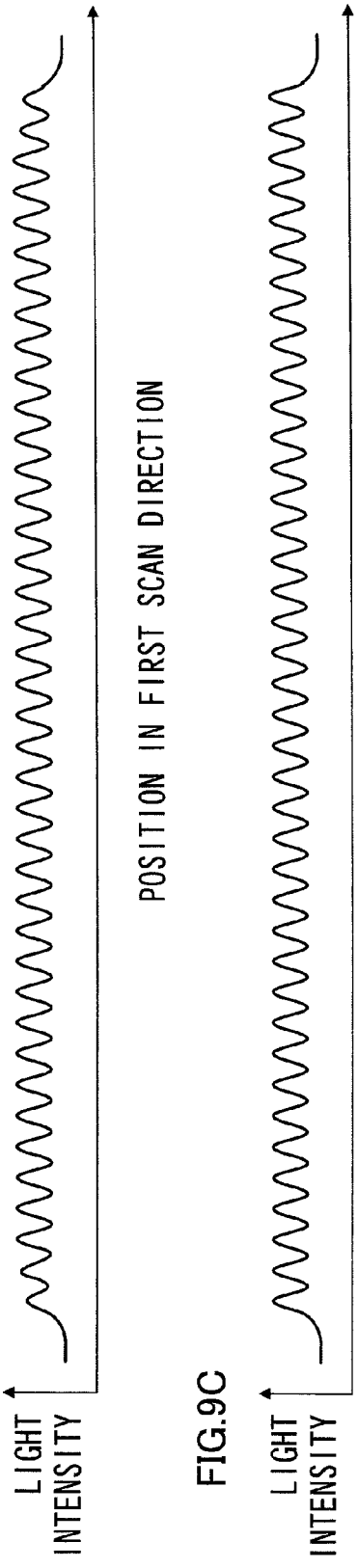
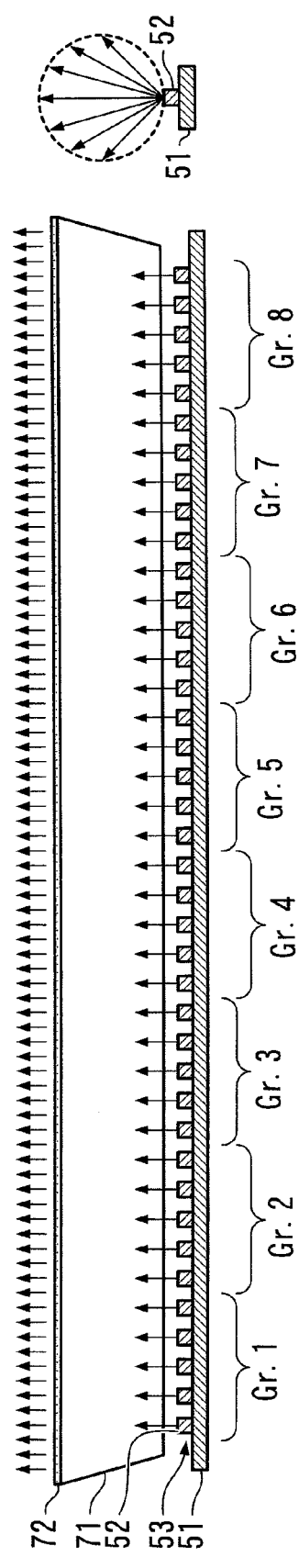

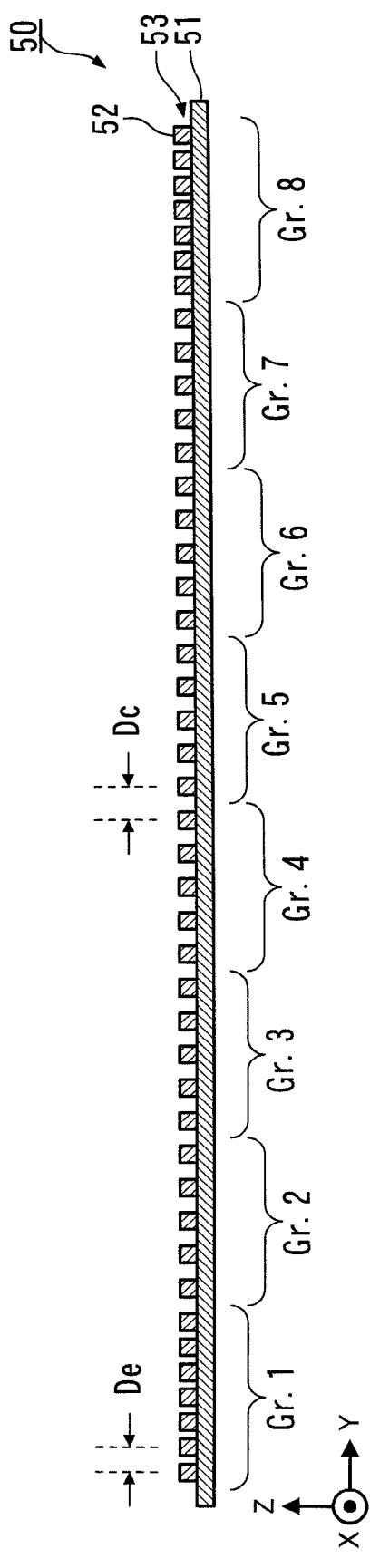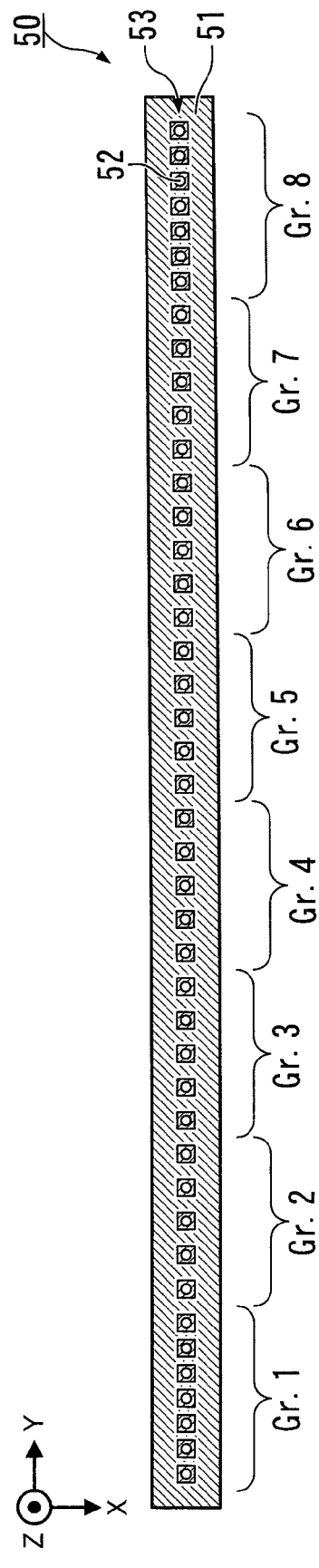

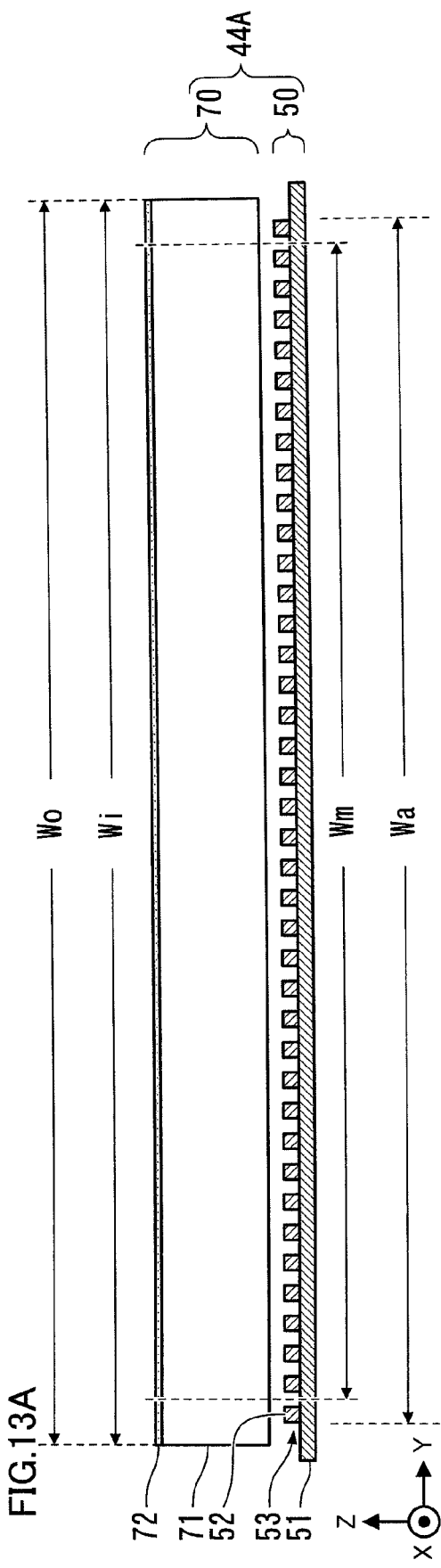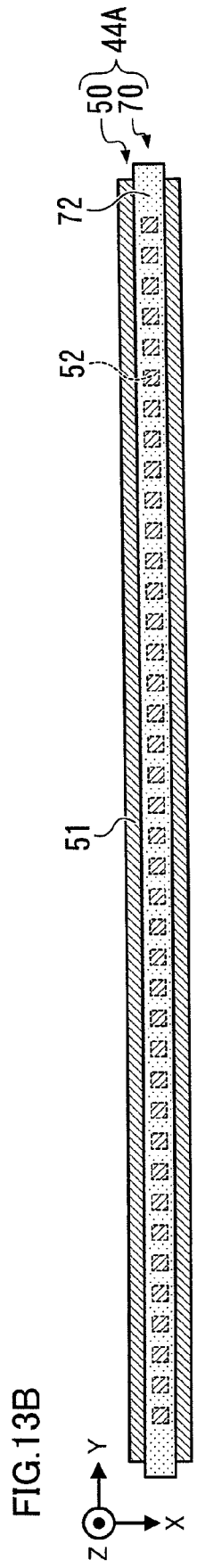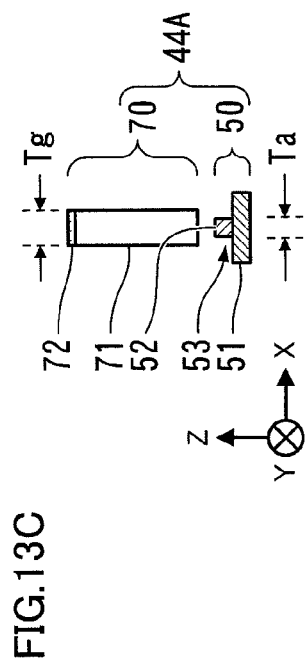

IMAGE READING APPARATUS AND LINEAR LIGHT SOURCE UNIT

CROSS REFERENCE TO RELATED APPLICATIONS

This application is based on and claims priority under 35 USC §119 from Japanese Patent Application No. 2009-169274 filed Jul. 17, 2009.

BACKGROUND

1. Technical Field

The present invention relates to an image reading apparatus and a linear light source unit.

2. Related Art

An image reading apparatus that reads an image on a document in the following manner is known. Specifically, the image reading apparatus performs an operation of causing light sources provided in one direction (a first scan direction) of the document to irradiate the document with light and then causing an image sensor to receive reflected light from the document irradiated with the light. The image reading apparatus reads an image on the document by repeating this operation while sequentially moving the position irradiated with the light, in a direction intersecting with the first scan direction (a second scan direction).

SUMMARY

According to an aspect of the present invention, there is provided an image reading apparatus including: a light emitting element array that includes plural light emitting elements arranged in line in a first scan direction of a document; a guiding unit that guides light entering from the light emitting element array, and that emits the light toward a reading position of the document while diffusing the light; a light receiving unit that receives reflected light from the reading position irradiated with the light from the light emitting element array through the guiding unit; and a scan unit that moves the reading position of the document in a second scan direction, the reading position being a position read by the light receiving unit.

BRIEF DESCRIPTION OF THE DRAWINGS

Exemplary embodiment(s) of the present invention will be described in detail based on the following figures, wherein:

FIG. 2 is a diagram for explaining a light path for image reading in the scanner;

FIGS. 3A to 3C are diagrams showing a configuration example of the light source unit provided to the scanner;

FIGS. 4A and 4B are diagrams showing a configuration example of the light emitting unit shown in FIGS. 3A to 3C;

FIGS. 5A and 5B are diagrams showing a configuration example of the guiding unit shown in FIGS. 3A to 3C;

FIGS. 7A to 7F are diagrams for explaining the behavior of light in the light source unit of the first exemplary embodiment;

FIGS. 8A and 8B are diagrams for explaining a configuration example of the diffusing member used in the second exemplary embodiment;

FIGS. 9A to 9E are diagrams for explaining the behavior of light in the light source unit of the second exemplary embodiment;

FIGS. 10A and 10B are diagrams showing a configuration example of the light emitting unit used in the third exemplary embodiment;

FIGS. 13A to 13C are diagrams for explaining another configuration example of the light source unit.

DETAILED DESCRIPTION

Hereinafter, a description will be given of exemplary embodiments of the present invention in detail with reference to the attached drawings.

First Exemplary Embodiment

Figure 1:
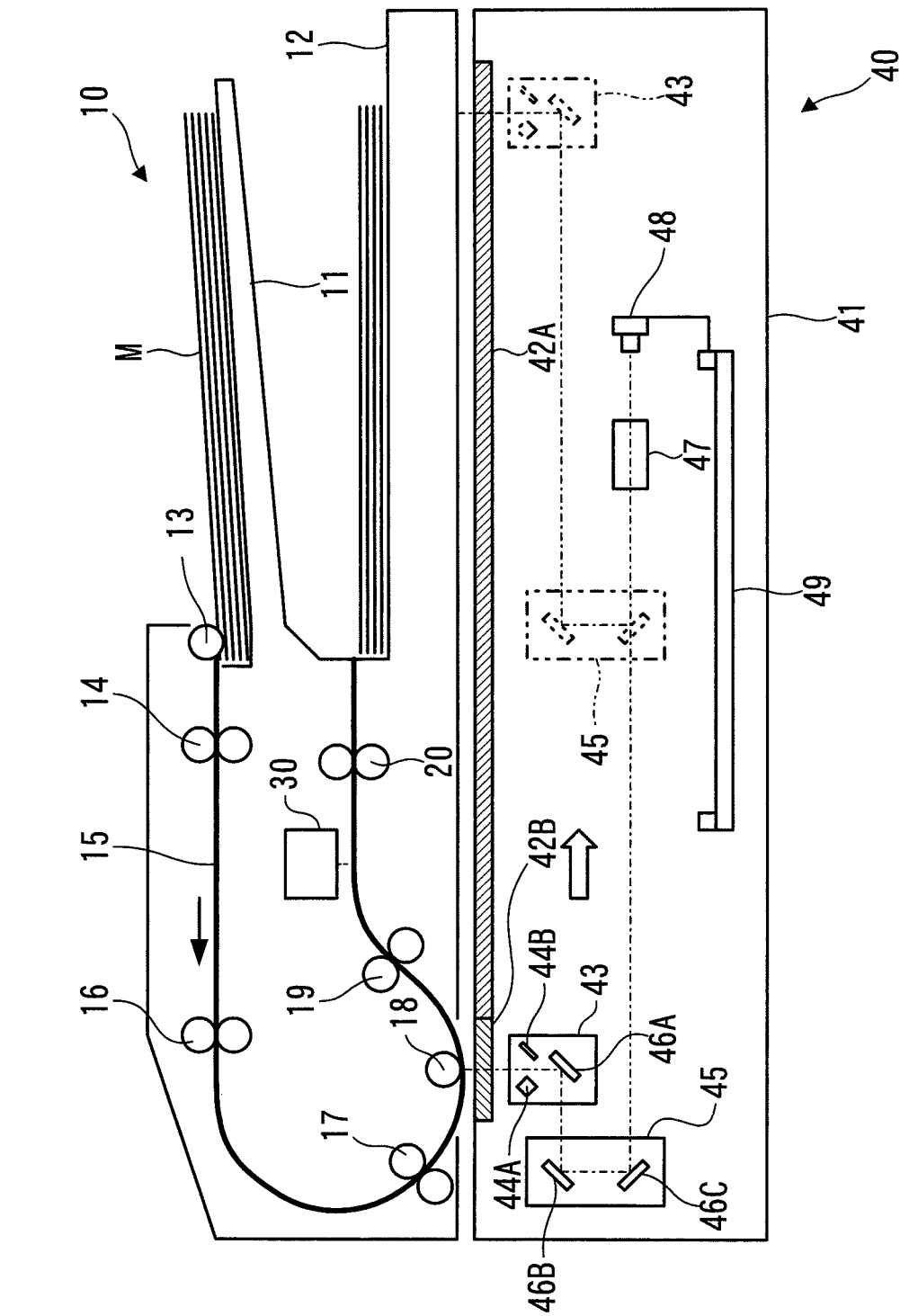
FIG. 1 is a diagram showing an example of the overall configuration of a reading apparatus to which the present exemplary embodiment is applied.

FIG. 1 is a diagram showing an example of the overall configuration of a reading apparatus to which the present exemplary embodiment is applied.

The reading apparatus includes: a document feeder 10 that sequentially transports a document from a stacked bundle of documents; and a scanner 40 that reads the image of a first surface (a front surface) of a document by scanning.

The document feeder 10 includes: a document storage part 11 that stacks a bundle of plural documents M; and an exit paper storage part 12 that is provided below the document storage part 11 and stacks the documents M having been read. In addition, the document feeder 10 includes a pick-up roll 13 that takes out and transports the documents M in the document storage part 11. Further, on the downstream side of the pick-up roll 13 in the document transporting direction, a sorting mechanism 14 that sorts the documents M one by one is provided. In a transport path 15 on which the documents M are transported, pre registration rolls 16, registration rolls 17, a platen roll 18, out rolls 19 and exit rolls 20 are provided in order from the upstream side in the document transporting direction. The pre registration rolls 16 transport the document M sorted one by one toward rolls on the downstream side while forming a loop of the documents M. The registration rolls 17 rotate, stop once, and then resume the rotation at right timing and supply the documents M while performing a registration adjustment to the document reading unit. The platen roll 18 assists transportation of the documents M being read by the scanner 40. Additionally, the platen roll 18 is used as white reference for shading correction in the scanner 40. The out rolls 19 transport the documents M read by the scanner 40 further to the downstream. The exit rolls 20 further transport the documents M having been read, and output the documents M to the exit paper storage part 12.

Additionally, the document feeder 10 includes a contact image sensor (CIS) 30 that reads the image of a second surface (a back surface) of a document M being transported, between the out rolls 19 and the exit rolls 20.

On the other hand, the scanner 40 supports the above-mentioned document feeder 10 openably and closably, and supports the document feeder 10 with a device frame 41, and reads the image of the first surface (the front surface) of a document M transported by the document feeder 10. The scanner 40 includes: the device frame 41 forming a housing; a first platen glass 42A on which a document M having an image thereon to be read is placed in a stationary state; and a second platen glass 42B that is provided below the platen roll 18 and forms an opening portion for light in order to read the document M transported by the document feeder 10.

In addition, the scanner 40 includes: a full-rate carriage 43 that reads an image by staying below the second platen glass 42B or by scanning across the entire first platen glass 42A; and a half-rate carriage 45 that supplies light obtained from the full-rate carriage 43 to an image forming part. Here, the full-rate carriage 43 includes: a light source unit 44A that irradiates the document M with light; a light source mirror 44B that reflects, toward the document M, the light from the light source unit 44A; and a first mirror 46A that receives reflected light obtained from the document M. Moreover, the half-rate carriage 45 includes a second mirror 46B and a third mirror 46C that provides the light obtained from the first mirror 46A to the image forming part.

Furthermore, the scanner 40 includes an image-forming lens 47, as an example of the image forming part, and a charge coupled device (CCD) image sensor 48, as an example of a light receiving unit. Among them, the image-forming lens 47 optically reduces an optical image obtained from the third mirror 46C. Meanwhile, the CCD image sensor 48 photoelectrically converts an optical image formed by the image-forming lens 47. That is, in the scanner 40, an image is formed at the CCD image sensor 48 using a so-called minification optical system. In the present exemplary embodiment, a CCD image sensor that includes a red line sensor, a green line sensor and a blue line sensor arranged side by side in the second scan direction is used as the CCD image sensor 48. Thus, an image formed on a document M is read as a full color image by use of the CCD image sensor 48.

Further, the scanner 40 includes a control/image-processing unit 49. The control/image-processing unit 49 performs various types of image processing on image data of the front and back surfaces of a document inputted from the CCD image sensor 48 and the above-mentioned CIS 30. The control/image-processing unit 49 controls operations of each unit in the reading operation of the reading apparatus.

For example, in a case of a fixed reading mode where an image on a document M placed on the first platen glass 42A is to be read, the full-rate carriage 43 and the half-rate carriage 45 move with a ratio of 2:1 in the direction indicated by an arrow in FIG. 1. At this time, the light from the light source unit 44A provided in the full-rate carriage 43 is irradiated to the read surface (the first surface) of the document M. Then, the reflected light from the document M is reflected at the first mirror 46A, the second mirror 46B and the third mirror 46C in this order and is guided to the image-forming lens 47. The light guided to the image-forming lens 47 forms an image on a light receiving face of the CCD image sensor 48. Each color sensor forming the CCD image sensor 48 is a one-dimensional sensor and processes one line at a time. When reading of one line in the line direction (first scan direction of the scan) is finished, the full-rate carriage 43 and the half-rate carriage 45 are moved to a direction intersecting with the first scan direction (second scan direction of the scan) so as to read the subsequent line of the document M. By executing the above operation across the entire document M, document reading of one page is completed.

On the other hand, in a case of a transport reading mode where an image on a document M transported by the document feeder 10 is to be read, the document M transported in the second scan direction passes over the second platen glass 42B. At this time, the full-rate carriage 43 and the half-rate carriage 45 are in a stopped state at a solid-line position shown in FIG. 1. The reflected light of the first line of the document M being transported forms an image at the image-forming lens 47 through the first mirror 46A, the second mirror 46B, and the third mirror 46C. The image is then read by the CCD image sensor 48. Specifically, after the one line in the first scan direction is processed at a time by the CCD image sensor 48, one subsequent line in the first scan direction of the document M transported by the document feeder 10 is read. Then, after a front end of the document M has reached a reading position of the second platen glass 42B, by passage of a rear end of the document M over the reading position of the second platen glass 42B, document reading of one page across the second scan direction is completed.

Here, in the fixed reading mode, the full-rate carriage 43 and the half-rate carriage 45 serve as a scan unit. On the other hand, in the transport reading mode, the document feeder 10 serves as a scan unit.

In the present exemplary embodiment, the second surface of a document M may also be read by the CIS 30 at a time during the transportation of the document M, during which the full-rate carriage 43 and the half-rate carriage 45 are stopped and the first surface of the document M is read by the CCD image sensor 48 through the second platen glass 42B, as described above. Specifically, both of the front and back surfaces of the document M may be read at single transportation to the transport path 15, by use of the CCD image sensor 48 and the CIS 30.

FIG. 2 is a diagram for explaining a light path for image reading in the above-mentioned scanner 40. Note that the light path shown in FIG. 2 is the same in the fixed reading mode and the transport reading mode described above.

A reading position R of the document M is irradiated with light emitted from the light source unit 44A and light emitted from the light source unit 44A and then reflected from the light source mirror 44B (not shown in the figure). In the fixed reading mode, the full-rate carriage 43 (and the half-rate carriage 45) moves in the second scan direction while the document M is being fixed. Accordingly, a point on the document M that is to be located at the reading position R moves one by one in the second scan direction. In the transport reading mode, on the other hand, the document M itself moves in the second scan direction while the full-rate carriage 43 (and the half-rate carriage 45) is being fixed. Accordingly, a point on the document M that is to be located at the reading position R moves one by one in the second scan direction. Then, reflected light from the reading position R enters the image-forming lens 47 through the first mirror 46A to the third mirror 46C. The light is then emitted from the image-forming lens 47, and subsequently enters the CCD image sensor 48.

Here, due to the properties of the lens, the image-forming lens 47 causes a light intensity to attenuate near a peripheral part of the lens, as compared to a center part thereof. A light intensity in parts corresponding to first-scan-direction edge portions of the document M tends to be smaller than that in a part corresponding to a first-scan-direction center part of the document M. For this reason, a light reception result of the CCD image sensor 48 shows that, according to the attenuation property of the lens, a light intensity in the parts corresponding to the first-scan-direction edge parts of the document M tends to be smaller than that in the part corresponding to the first-scan-direction center part of the document M.

FIGS. 3A to 3C are diagrams showing a configuration example of the light source unit 44A provided to the scanner 40. FIG. 3A is a front view of the light source unit 44A. FIG. 3B is a top view of the light source unit 44A, seen from an output face side of light. FIG. 3C is a side view of the light source unit 44A.

The light source unit 44A is an example of a linear light source unit, and includes: a light emitting unit 50 that emits light; and a guiding unit 70 that guides light emitted from the light emitting unit 50 to the reading position R (see FIG. 2).

Note that, in the following descriptions, X and Y refer to the second scan direction and the first scan direction, respectively. In addition, a direction extending from the light emitting unit 50 to the guiding unit 70, namely, a direction orthogonal to the second scan direction X and the first scan direction Y is referred to as an optical axis direction Z. Accordingly, a crosswise direction in FIGS. 3A and 3B is the first scan direction Y, and a crosswise direction in FIG. 3C is the second scan direction X.

FIGS. 4A and 4B are diagrams showing a configuration example of the light emitting unit 50 shown in FIGS. 3A to 3C. FIGS. 5A and 5B are diagrams showing a configuration example of the guiding unit 70 shown in FIGS. 3A to 3C. FIG. 4A is a front view of the light emitting unit 50, and FIG. 4B is a top view of the light emitting unit 50. FIG. 5A is a front view of the guiding unit 70, and FIG. 5B is a top view of a diffusing member 72 (to be described in detail later) forming the guiding unit 70. Note that a crosswise direction in FIGS. 4A to 5B is the first scan direction Y.

First, the configuration of the light emitting unit 50 will be described.

The light emitting unit 50 includes: a board 51 that extends in the first scan direction Y and has wirings formed inside; and plural light emitting elements 52 that are arranged in line in the first scan direction Y on one of the sides of the board 51. The light emitting elements 52 are electrically connected to the wirings formed in the board 51, and are fixed. Note that, in the following descriptions, the light emitting elements 52 arranged in line in one direction will be called a light emitting element array 53. The light emitting element array 53, which is an example of a light emitting element array, is configured to emit light that travels mainly in the optical axis direction Z. The light emitting element array 53 of the present exemplary embodiment is constituted of forty light emitting elements 52.

Moreover, in the present exemplary embodiment, the forty light emitting elements 52 forming the light emitting element array 53 are arranged in the first scan direction Y at regular intervals. Accordingly, in this example, a center-part interval Dc that is an arrangement interval between two adjacent light emitting elements 52 in a first-scan-direction center part of the light emitting element array 53 is equal to an edge-part interval De that is an arrangement interval between two adjacent light emitting elements 52 in any one of first-scan-direction edge parts thereof.

In the present exemplary embodiment, the light emitting elements 52 are each formed of a so-called white light emitting diode (LED) that emits light including color components of red (R), green (G) and blue (B). The white LED of the present exemplary embodiment is obtained by a combination of an LED that emits ultraviolet light or blue light and a phosphor that converts the light emitted from the LED into long-wavelength light, and is thus configured to output light including RGB components. Instead, a combination of a red LED that emits red light, a green LED that emits green light, and a blue LED that emits blue light may be used as the white LED. If the CCD image sensor 48 is a sensor for monochrome imaging, the light emitting elements 52 need not emit white light, and one configured to emit light having a wavelength for which the CCD image sensor 48 has sensitivity may be used.

Further, in the present exemplary embodiment, the forty light emitting elements 52 forming the light emitting element array 53 are grouped into eight groups Gr.1 to Gr.8 each having five light emitting elements 52 that are successive in the first direction Y. In each of the groups Gr.1 to Gr.8, the five light emitting elements 52 are connected to one another in series or in parallel through the wirings provided in the board 51. In addition, the light emitting elements 52 forming any of the groups Gr.1 to Gr.8 are connected to each other so as not to be connected to one in a different group through the wirings of the board 51. Moreover, in the board 51, electrodes (not shown in the figure) are provided for the respective groups Gr.1 to Gr.8 to supply power thereto individually. Accordingly, in the present exemplary embodiment, on and off control is performed individually for each of the groups Gr.1 to Gr.8, and a value of current supplied for each of the groups Gr.1 to Gr.8 is individually controllable, as well.

Next, the configuration of the guiding unit 70 will be described.

The guiding unit 70 includes a light-guiding member 71 and the diffusing member 72. The light-guiding member 71 extends in the first scan direction Y and guides light emitted from the light emitting unit 50. The diffusing member 72 extends in the first scan direction Y, and outputs the light travelling inside the light-guiding member 71 while diffusing the light, at an edge part in the optical axis direction Z of the light-guiding member 71.

In the present exemplary embodiment, the light-guiding member 71 is formed of a material, such as an acrylic resin for example, that transmits light emitted from the light emitting unit 50. In addition, the light-guiding member 71 has a shape of an inverted trapezoid whose cross section on a YZ plane becomes wider in the optical axis direction Z, and whose cross section on an XZ plane is rectangular. The light-guiding member 71 has an input face 71a and an output face 71b. The input face 71a is a rectangular flat face extending in the first scan direction Y, and receives light emitted from the light emitting unit 50. The output face 71b is a rectangular flat face extending in the first scan direction Y, and emits light that has entered the light-guiding member 71 through the input face 71a. The input face 71a and the output face 71b are positioned facing each other. The length in the first scan direction Y of the output face 71b is set larger than that of the input face 71a. Moreover, the light-guiding member 71 further has first side faces 71c and second side faces 71d. The first side faces 71c are formed at respective edge parts in the first scan direction Y of the light-guiding member 71, and are flat faces inclining relative to the optical axis direction Z. The second side faces 71d are formed at respective edge parts in the second scan direction X of the light-guiding member 71, and are flat faces extending in the optical axis direction Z. Here, the input face 71a, the output face 71b, the first side faces 71c and the second side faces 71d are each formed of a smooth surface. Although being formed using a resin in this example, the light-guiding member 71 may be formed using a material other than a resin, for example, a glass or the like. In addition, although being formed of flat faces in this example, the first side faces 71c may have steps formed therein or formed of curved faces, for example.

The diffusing member 72 is formed of a material, such as a glass, an acryl, or a polycarbonate for example, that transmits light emitted from the light emitting unit 50 through the light-guiding member 71. The diffusing member 72 has a shape of a film or a plate, and has an input face 72a and an output face 72b. The input face 72a receives light emitted from the output face 71b of the light-guiding member 71. The output face 72b emits light that has entered the diffusing member 72 through the input face 72a. The input face 72a and the output face 72b are positioned facing each other. The input face 72a of the diffusing member 72 is fixed to the output face 71b of the light-guiding member 71 by bonding or the like, and thereby the guiding unit 70 is formed. For this bonding of the diffusing member 72 to the light-guiding member 71, an adhesive that transmits light emitted from the light emitting unit 50 may be used.

Moreover, the output face 72b of the diffusing member 72 is processed to have asperities so as to emit light that has entered the diffusing member 72 through the input face 72a while diffusing and scattering the light. Here, in the output face 72b of the diffusing member 72, when the mountain height of asperities in a first-scan-direction center part is referred to as a center-part mountain height Hc and the mountain height of asperities in first-scan-direction edge parts is referred to as an edge-part mountain height He, the center-part mountain height Hc and the edge-part mountain height He are set almost equal to each other in the present exemplary embodiment. Further, in the output face 72b of the diffusing member 72, when the interval between adjacent convex portions in the first-scan-direction center part is referred to as a center-part convex-portion interval Lc and the interval between adjacent convex portions in the first-scan-direction edge parts is referred to as an edge-part convex-portion interval Le, the center-part convex-portion interval Lc and the edge-part convex-portion interval Le are set almost equal to each other in the present exemplary embodiment.

Here, the center-part convex-portion interval Lc and the edge-part convex-portion interval Le are set to values at least smaller than a center-part interval Dc and an edge-part interval De in the light emitting element array 53.

Note that the center-part mountain height Hc and the edge-part mountain height He are each derived by obtaining an average value of plural asperities existing in the corresponding area. In addition, the center-part convex-portion interval Lc and the edge-part convex-portion interval Le, too, are each derived by obtaining an average value of plural pairs of convex portions existing in the corresponding area.

In addition, the relative relationship between the light emitting unit 50 and the guiding unit 70 in the light source unit 44A will be described.

First, the light emitting unit 50 is placed so that a light output face of each of the light emitting elements 52 forming the light emitting element array 53 may be oriented in the optical axis direction Z. On the other hand, the guiding unit 70 is placed so that the input face 71a of the light-guiding member 71 may face the light emitting element array 53 of the light emitting unit 50. Here, a length (thickness) Tg of the light-guiding member 71 in the second scan direction X is set larger than a length (width) Ta in the second scan direction X of each of the light emitting elements 52 forming the light emitting element array 53. As a result, as seen from above as shown in FIG. 3B, the light emitting element array 53 is positioned in an inner area relative to a back face of the guiding unit 70.

In addition, in the light-guiding member 71 of the guiding unit 70, an output face width Wo that is the length in the first scan direction Y of the output face 71b is larger than an input face width Wi that is the length in the first scan direction Y of the input face 71a. Moreover, first-scan-direction edges of the output face 71b are located outside those of the input face 71a. Note that, in the present exemplary embodiment, the length in the first scan direction Y of each of the input face 72a and the output face 72b of the diffusing member 72 is set equal to the output face width Wo.

Further, an array width Wa that is the length in the first scan direction Y of the light emitting element array 53 of the light emitting unit 50 is smaller than the input face width Wi described above. Moreover, first-scan-direction edges of the light emitting element array 53 are located inside those of the input face 71a of the light-guiding member 71. As a result, when seen from the front as shown in FIG. 3A, the light emitting element array 53 is positioned below the input face 71a of the light-guiding member 71 of the guiding unit 70.

Note that, in the present exemplary embodiment, the input face 71a of the light-guiding member 71 serves as an input face of the guiding unit 70, and the output face 72b of the diffusing member 72 serves as an output face of the guiding unit 70.

Next, the relative relationship between the light source unit 44A and the document M located at the reading position R (see FIG. 2) will be described. Note that the length in the first scan direction Y of a maximum sized document M that may be scanned by the reading apparatus shown in FIG. 1 will be called a maximum-document width Wm in the following descriptions.

In the present exemplary embodiment, the output face width Wo of the guiding unit 70 is set larger than the maximum-document width Wm. Further, the input face width Wi of the guiding unit 70 and the array width Wa of the light emitting unit 50 are also set larger than the maximum-document width Wm. Moreover, first-scan-direction edges of the maximum-document width Wm are located inside those of the light emitting element array 53. Note that, in this example, one light emitting element 52 is located outside each of the first-scan-direction edges of the maximum-document width Wm.

Next, the control/image-processing unit 49 shown in FIG. 1 will be described.

Figure 6:
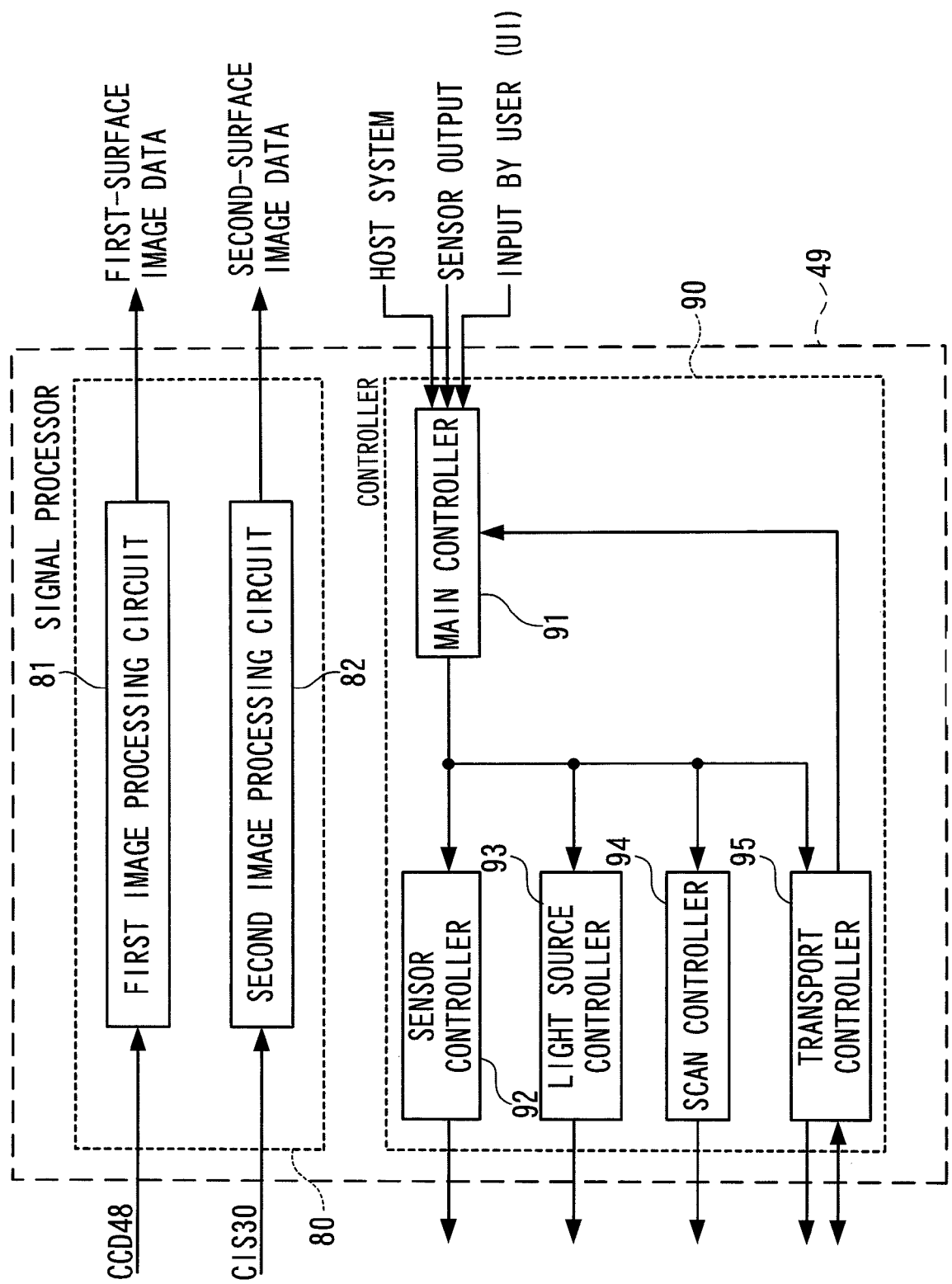
FIG. 6 is a block diagram for explaining a configuration example of the control/image-processing unit provided to the reading apparatus.

FIG. 6 is a block diagram for explaining a configuration example of the control/image-processing unit 49. The control/image-processing unit 49 includes a signal processor 80 and a controller 90. The signal processor 80 performs processing on image data inputted from sensors (sensors provided to the CCD image sensor 48 and the CIS 30), and the controller 90 controls operations of the document feeder 10 and the scanner 40.

The signal processor 80 includes a first image processing circuit 81 and a second image processing circuit 82. The first image processing circuit 81 performs processing on an input signal from the CCD image sensor 48 that reads the front surface (the first surface) of the document M. The second image processing circuit 82 performs processing on an input signal from the CIS 30 that reads the back surface (the second surface) of the document M. Here, the first image processing circuit 81 and the second image processing circuit 82 each include: an analog front end (AFE) that performs an offset adjustment and a gain adjustment on input analog image data; an analog-to-digital converter (ADC) that converts the analog image data into digital image data; a shading corrector that performs a shading correction on the digital image data; a shading correction data creator that creates shading correction data based on a result obtained by reading the platen roll 18; and the like. Then, digital image data obtained by the processing by the first image processing circuit 81 and digital image data obtained by the processing by the second image processing circuit 82 are outputted to the outside as first-surface image data and second-surface image data, respectively.

On the other hand, the controller 90 includes a main controller 91, a sensor controller 92, a light source controller 93, a scan controller 94, and a transport controller 95. Among these, the main controller 91 performs overall control of the document feeder 10 and the scanner 40. The sensor controller 92 controls capturing operations of image data by the sensors (not shown in the figure) provided to the CCD image sensor 48 and the CIS 30. The light source controller 93 performs on and off control of the light source unit 44A provided to the scanner 40 and light sources (not shown in the figure) provided to the CIS 30, according to reading timing. The light source controller 93 controls the amount of supply current, individually for each of the eight groups Gr.1 to Gr.8 forming the light emitting element array 53 of the light source unit 44A. The scan controller 94 turns on and off a motor of the scanner 40 to control scan operations of the full-rate carriage 43 and the half-rate carriage 45. The transport controller 95 controls a motor in the document feeder 10, and also controls: operations of the various rolls and of a feed clutch; gate switching operations; and the like.

These various controllers output control signals to the document feeder 10 and the scanner 40, and the operations of the document feeder 10 and the scanner 40 are controlled based on those control signals. The main controller 91 sets a reading mode based on a control signal from a host system, a sensor output detected during, for example, auto select reading function, selection made by a user through a user interface (UI) or the like, and others, and controls the document feeder 10 and the scanner 40. The reading mode includes the fixed reading mode and the transport reading mode described above.

Next, with reference to FIGS. 3A to 7F, a description will be given of operations of the light source unit 44A performed when the reading apparatus performs reading operations. FIGS. 7A to 7F are diagrams for explaining the behavior of light in the light source unit 44A.

When the reading operations start, the light source controller 93 of the controller 90 supplies a current (a forward current) to each of the groups Gr.1 to Gr.8 forming the light emitting element array 53 of the light emitting unit 50. The supply current here is a current travelling from the anode to the cathode. Receiving the forward current in this way, each of the light emitting elements 52 forming the light emitting element array 53 emits white light. Here, it is assumed that forward currents having the same magnitude are continuously supplied to the respective groups Gr.1 to Gr.8, and as a result, the light emitting elements 52 output white light having the same light intensity.

FIG. 7A is a front view of the light source unit 44A. FIG. 7B shows light distribution characteristics of the light emitting elements 52.

Each light emitting element 52 emits white light beams radially toward the optical axis direction Z. Among those white light beams emitted radially, one travelling in the optical axis direction Z has the largest intensity.

The white light thus emitted from the light emitting elements 52 enters the light-guiding member 71 through the input face 71a (see FIG. 5A) provided to the light-guiding member 71 of the guiding unit 70. Although FIG. 7A shows, for simple illustration, as if the travelling direction of the light from each of the light emitting elements 52 is in the optical axis direction Z, actually, the light enters the light-guiding member 71 through the input face 71a at various angles as described using FIG. 7B.

The white light that has thus entered the light-guiding member 71 travels inside the light-guiding member 71 toward the output face 71b. While the white light travels in the light-guiding member 71, some of the light travels toward the first side faces 71c and the second side faces 71d. Such light is reflected at the interface because of the incident angle relative to the first side faces 71c or the second side faces 71d and the difference in a refraction index between the first side faces 71c or the second side faces 71d and their outer layer (air in this case). The reflected light returns to the inside of the light-guiding member 71 and further travels therein. Moreover, since the light-guiding member 71 has a structure that becomes wider in the first scan direction Y from the input face 71a side to the output face 71b side, light travelling inside the light-guiding member 71 also spreads in the first scan direction Y from the input face 71a side to the output face 71b side. Since the light-guiding member 71 is formed of a material that transmits white light, only a small amount of white light is attenuated by the light-guiding member 71. Moreover, change in hue of light, which occurs when light of a particular color component is exclusively absorbed, occurs less.

Then, the white light that has reached the output face 71b of the light-guiding member 71 enters the input face 72a of the diffusing member 72 through the output face 71b. Thereafter, the light is emitted to the outside through the output face 72b. Here, since the output face 72b has asperities formed in an entire area thereof in the first scan direction, the white light that has reached the output face 72b is diffused and scattered when being emitted. Then, the white light that has been emitted from the output face 72b travels toward the reading position R (see FIG. 2) of the document M.

FIG. 7C shows an example of a light intensity distribution of the white light emitted from the light emitting element array 53 of the light emitting unit 50 shown in FIG. 7A.

In the present exemplary embodiment, the light emitting element array 53 is formed of forty light emitting elements 52 each of which has light distribution characteristics as shown in FIG. 7B. Accordingly, a light intensity distribution immediately above the light emitting element array 53 exhibits waves relative to the first scan direction Y. Here, a point immediately above each light emitting element 52 is a local maximum point of the light intensity; therefore, forty peaks exist in this example. Further, since forward currents having the same magnitude are supplied to the respective light emitting elements 52 forming the light emitting element array 53 in this example, the heights of the respective forty peaks are almost the same.

Next, FIG. 7D shows an example of a light intensity distribution obtained when the white light exhibiting the light intensity distribution shown in FIG. 7C reaches the output face 71b of the light-guiding member 71 of the guiding unit 70 through the input face 71a.

In the present exemplary embodiment, as described earlier, the light-guiding member 71 has the cross section of an inverted trapezoidal shape. For this reason, the light intensity distribution of the output face 71b of the light-guiding member 71 is more spread at edges in the first scan direction Y than that of the light emitting element array 53 shown in FIG. 7C.

Moreover, FIG. 7E shows an example of a light intensity distribution obtained when the white light having the light intensity distribution shown in FIG. 7D is emitted from the output face 72b after entering the diffusing member 72 through the input face 72a.

In the present exemplary embodiment, asperities are formed in an entire area of the output face 72b of the diffusing member 72. Accordingly, even when the white light having the light intensity distribution shown in FIG. 7D enters the input face 72a of the diffusing member 72, the white light is diffused and scattered by those asperities on the output face 72b. This reduces the waves, namely light intensity variations, which are caused due to the structure of the light emitting element array 53 from which the light has originally emitted. As a result, the light intensity distribution immediately above the diffusing member 72 now has a shape flatter in the first scan direction Y.

Moreover, since edges in the first scan direction Y of the area having the light intensity distribution of the flatter shape are located outside those of the maximum-document width Wm (see FIG. 3A), there is less reduction in the light intensity of white light emitted to the edge areas in the first scan direction Y of the document M.

In the present exemplary embodiment, the scanner 40 performs image reading by using a reduced optical system. For this reason, there is a concern that, even when white light is emitted to the reading position R with the light intensity variations being reduced in the first scan direction Y, the image-forming lens 47 may cause a light intensity in a part corresponding to edges in the first scan direction Y of the document M to be smaller than that in a part corresponding to the center part in the first scan direction Y of the document M, as described using FIG. 2.

For example, a conceivable countermeasure against this concern is to supply, among the groups Gr.1 to Gr.8 forming the light emitting element array 53 of the light emitting unit 50, the groups Gr.1 and Gr.8 with a forward current larger than that supplied to the other groups Gr.2 to Gr.7. The groups Gr.1 and Gr.8 here are located at the respective edge parts in the first scan direction Y.

FIG. 7F shows an example of a light intensity distribution of light emitted from the output face 72b of the diffusing member 72, in a case where the value of supply current is controlled using the above-described method.

By thus controlling the value of supply current, light emitted by each of the light emitting elements 52 forming the groups Gr.1 and Gr.8 is allowed to have a larger intensity than light emitted by each of the light emitting elements 52 forming the other groups Gr.2 to Gr.7. Consequently, the waves, namely light intensity variations, which are caused due to the structure of the light emitting element array 53 from which the light has originally emitted are reduced in the light intensity distribution immediately above the diffusing member 72, and a light intensity is larger in the edge parts in the first scan direction Y than in the center part.

At the reading position R, a light intensity in edge parts in the first scan direction Y is then increased and thus becomes larger than that in a center part. Accordingly, even when light reflected from the reading position R passes through the image-forming lens 47 and the light intensity in the edge parts in the first scan direction Y are thereby attenuated compared to the center part, the attenuation of the light intensity in the edge parts in the first scan direction Y is cancelled by the increased light intensity by the adjustment of the supply current value. Thus, when a blank document M is placed at the reading position R for example, the CCD image sensor 48 receives light having less variation between the center part and the edge parts in the first scan direction Y.

Additionally, in the present exemplary embodiment, the first image processing circuit 81 creates shading correction data based on a result obtained by reading the surface of the platen roll 18 by use of the scanner 40. Then, in the actual reading of the document M, the first image processing circuit 81 performs shading correction by using the shading correction data on a light reception result obtained by the CCD image sensor 48.

Here, in the scanner 40 employing a reduced optical system, due to the reason given above, a light intensity tends to decrease more in the edge parts in the first scan direction Y than in the center part. For this reason, performing the shading correction tends to narrow a dynamic range more in the edge parts in the first scan direction Y than in the center part.

However, when a light intensity distribution of light emitted from the light source unit 44A to the reading position R is set as described above, the difference in the dynamic range between the center part and the edge parts in the first scan direction Y is reduced.

Although the output face width Wo is set larger than the input face width Wi in the guiding unit 70 forming the light source unit 44A in the first exemplary embodiment, the present invention is not limited to this.

FIGS. 13A to 13C show another configuration example of the light source unit 44A. FIG. 13A is a front view of the light source unit 44A. FIG. 13B is a top view of the light source unit 44A, seen from the light output face side. FIG. 13C is a side view of the light source unit 44A.

As shown in FIGS. 13A to 13C, the light-guiding member 71 forming the guiding unit 70 may be a rectangular parallelepiped in which the input face width Wi and thereby the output face width Wo in the guiding unit 70 are the same. When the configuration shown in FIGS. 13A to 13C is employed, reduction in a light intensity of the first-scan-direction edge parts is reduced, as compared to the case where the configuration shown in FIGS. 3A to 3C is employed. Accordingly, the light intensity of the first-scan-direction edge parts of the light emitting element array 53 may not have to be increased to have a light intensity larger than that of the first-scan-direction center part. However, when the configuration shown in FIGS. 13A to 13C is employed, the light intensity of the first-scan-direction edge parts of the light emitting element array 53 may still be increased to have a light intensity larger than that of the first-scan-direction center part.

Second Exemplary Embodiment

Although the basic configuration of the present exemplary embodiment is almost the same as that of the first exemplary embodiment, in the output face 72b of the diffusing member 72 of the guiding unit 70, asperities formed in the center part in the first scan direction Y and those formed in the edge parts have different structures from each other. Note that a component of the present exemplary embodiment that is similar to that of the first exemplary embodiment will be denoted by the same reference numeral, and will not be described in detail here.

FIGS. 8A and 8B are diagrams showing a configuration example of the diffusing member 72 used in the present exemplary embodiment. Specifically, FIG. 8A is a top view showing an example of the diffusing member 72, and FIG. 8B is a top view showing another example of the diffusing member 72.

In the example shown in FIG. 8A, the output face 72b of the diffusing member 72 is processed to have asperities. What should be noted is that, in the example shown in FIG. 8A, the edge-part mountain height He is set lower than the center-part mountain height Hc. In the example shown in FIG. 8A, the center-part convex-portion interval Lc and the edge-part convex-portion interval Le are set almost equal to each other.

Meanwhile, in the example shown in FIG. 8B, the output face 72b of the diffusing member 72 is processed to have asperities, as well. In the example shown in FIG. 8B, the edge-part mountain height He is set lower than the center-part mountain height Hc, as in the example shown in FIG. 8A. In addition, in the example shown in FIG. 8B, the edge-part convex-portion interval Le is set larger than the center-part convex-portion interval Lc.

Note that the adjustment of the mountain height as shown in FIGS. 8A and 8B may be made by varying the mountain heights continuously or in steps from the center part toward the edge parts in the first scan direction Y. Moreover, the interval adjustment as shown in FIG. 8B may also be made by varying the intervals continuously or in steps from the center part toward the edge parts in the first scan direction Y.

FIGS. 9A to 9E are diagrams for explaining the behavior of light in the light source unit 44A formed by using the light emitting unit 50 described in the first exemplary embodiment and the guiding unit 70 having the diffusing member 72 described above. FIGS. 9A to 9D are the same as FIGS. 7A to 7D described in the first exemplary embodiment, and are therefore not described here.

FIG. 9E shows an example of a light intensity distribution obtained when white light having the light intensity distribution shown in FIG. 9D is outputted from the output face 72$b$ after entering the diffusing member 72 through the input face 72$a$.

In the present exemplary embodiment, asperities are formed in an entire area of the output face 72$b$ of the diffusing member 72. Accordingly, even when white light having the light intensity distribution shown in FIG. 7D enters the input face 72$a$ of the diffusing member 72, the white light is diffused and scattered by the asperities on the output face 72$b$. If, for example, the diffusing member 72 having the configuration shown in FIG. 8A is employed, the center-part mountain height Hc is larger than the edge-part mountain height He. Thus, light passing through the edge parts in the first scan direction Y of the diffusing member 72 is less likely to diffuse than light passing through the center part thereof. Meanwhile, if, for example, the diffusing member 72 having the configuration shown in FIG. 8B is employed, the center-part mountain height Hc is larger than the edge-part mountain height He, and the center-part convex-portion interval Lc is smaller than the edge-part convex-portion interval Le. Thus, light passing through the edge parts in the first scan direction Y of the diffusing member 72 is, further, less likely to diffuse than light passing through the center part thereof. In other words, when the configuration shown in FIGS. 8A and 8B are employed, light directionality is improved also in the edge parts in the first scan direction Y, as compared to the center part thereof.

Consequently, the waves, namely light intensity variations, which are caused due to the structure of the light emitting element array 53 from which the light has originally emitted are reduced in the light intensity distribution immediately above the diffusing member 72, and a light intensity is larger in the edge parts in the first scan direction Y than in the center part. In other words, the present exemplary embodiment achieves the same effect obtained in the first exemplary embodiment through adjustment of the value of supply current for each of the groups.

Third Exemplary Embodiment

Although the basic configuration of the present exemplary embodiment is almost the same as that of the first exemplary embodiment, the light emitting elements 52 forming the light emitting element array 53 of the light emitting unit 50 have different arrangement intervals between the center part and the edge parts in the first scan direction Y. Note that a component of the present exemplary embodiment that is similar to that of the first exemplary embodiment will be denoted by the same reference numeral, and will not be described in detail here.

FIGS. 10A and 10B are diagrams showing a configuration example of the light emitting unit 50 used in the present exemplary embodiment. Specifically, FIG. 10A is a front view of the light emitting unit 50, and FIG. 10B is a top view of the light emitting unit 50.

In the present exemplary embodiment, the light emitting element array 53 is constituted of forty-four light emitting elements 52.

The forty-four light emitting elements 52 are grouped into eight groups Gr.1 to Gr.8 as in the first exemplary embodiment. However, each of the groups Gr.2 to Gr.7 located at the center part in the first scan direction Y is formed of five light emitting elements 52, whereas each of the groups Gr.1 and Gr.8 located at the respective edge parts in the first scan direction Y is formed of seven light emitting elements 52.

Additionally, in this example, the edge-part interval De in the groups Gr.1 and Gr.8 located at the respective edge parts in the first scan direction Y of the light emitting element array 53 is set smaller than the center-part interval Dc in the groups Gr.2 to Gr.7 located at the center part in the first scan direction Y thereof.

In a case where the light source unit 44A is formed by using the light emitting unit 50 described above and the guiding unit 70 described in the first exemplary embodiment, if forward currents having the same magnitude are supplied to the light emitting elements 52 forming the light emitting element array 53, light emitted by each of the light emitting elements 52 forming the groups Gr.1 and Gr.8 is allowed to have a larger intensity than light emitted by each of the light emitting elements 52 forming the other groups Gr.2 to Gr.7. Consequently, the waves, namely light intensity variations, which are caused due to the structure of the light emitting element array 53 from which the light has originally emitted are reduced in the light intensity distribution immediately above the diffusing member 72, and a light intensity is larger in the edge parts in the first scan direction Y than in the center part. In other words, the present exemplary embodiment achieves a light intensity distribution equivalent to that shown in FIG. 7F.

Fourth Exemplary Embodiment

The present exemplary embodiment is almost the same as the first exemplary embodiment. However, in the first exemplary embodiment, the control of the value of supply current is performed on each of the groups Gr.1 to Gr.8, whereas in the present exemplary embodiment, the value of supply current for each of the groups Gr.1 to Gr.8 is set to the same magnitude and control of periods during which currents are supplied to the respective groups Gr.1 to Gr.8 is performed. Accordingly, in the present exemplary embodiment, supply of currents to the respective groups Gr.1 to Gr.8 is performed intermittently. Note that a component of the present exemplary embodiment that is similar to that of the first exemplary embodiment will be denoted by the same reference numeral, and will not be described in detail here.

Figure 11:
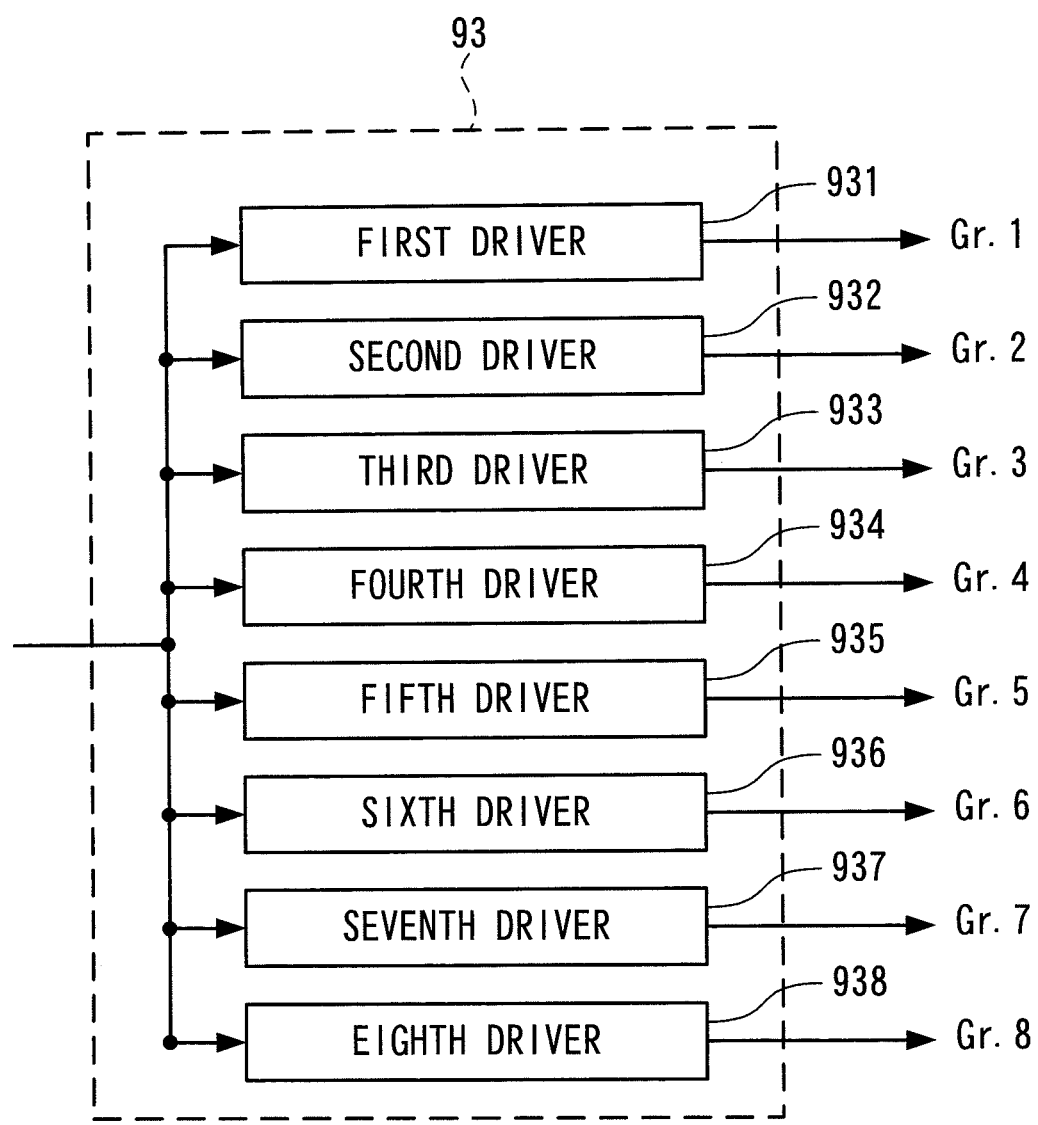
FIG. 11 is a block diagram for explaining a configuration example of the light source controller used in the fourth exemplary embodiment.

FIG. 11 is a block diagram for explaining a configuration example of the light source controller 93 used in the present exemplary embodiment. The light source controller 93 includes: a first driver 931 that drives five light emitting elements 52 forming the group Gr.1; a second driver 932 that drives five light emitting elements 52 forming the group Gr.2; a third driver 933 that drives five light emitting elements 52 forming the group Gr.3; a fourth driver 934 that drives five light emitting elements 52 forming the group Gr.4; a fifth driver 935 that drives five light emitting elements 52 forming the group Gr.5; a sixth driver 936 that drives five light emitting elements 52 forming the group Gr.6; a seventh driver 937 that drives five light emitting elements 52 forming the group Gr.7; and an eighth driver 938 that drives five light emitting elements 52 forming the group Gr.8.

Figure 12:
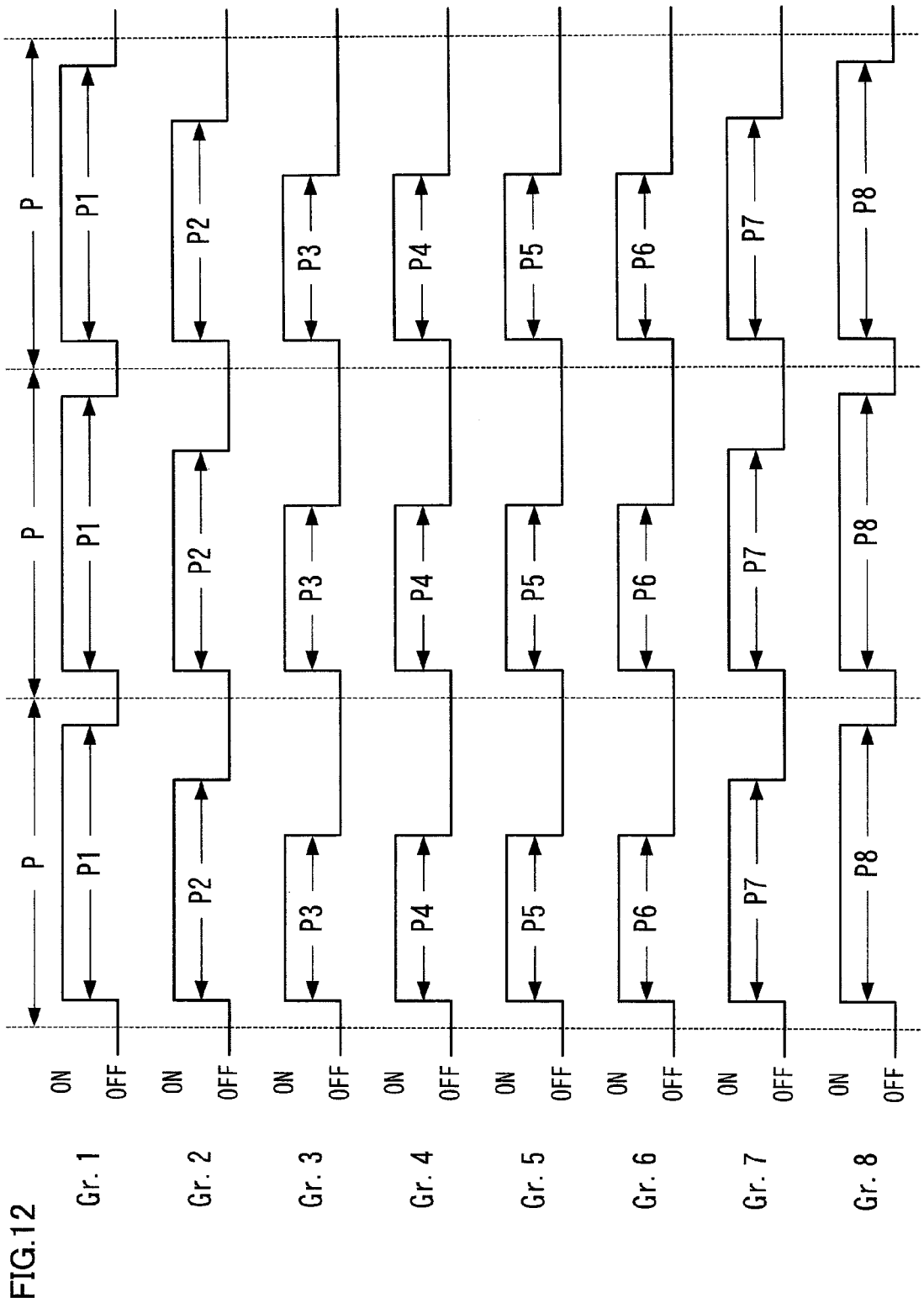
FIG. 12 is a timing chart showing an example of driving signals outputted from the light source driver to each of the groups forming the light emitting element array in the fourth exemplary embodiment.

FIG. 12 is a timing chart showing an example of driving signals outputted from the light source driver 93 to each of the groups Gr.1 to Gr.8 forming the light emitting element array 53 in the present exemplary embodiment.

In the present exemplary embodiment, the driving signals are supplied from the light source controller 93 to each of the groups Gr.1 to Gr.8 with a light emitting cycle P. Note that, in FIG. 12, "ON" denotes a state where a current having a predetermined magnitude is supplied, and "OFF" denotes a state where supply of a current is stopped. Additionally, in one light emitting cycle P, a period during which the driving signal to the group Gr.1 is ON, a period during which the driving signal to the group Gr.2 is ON, a period during which the driving signal to the group Gr.3 is ON, a period during which the driving signal to the group Gr.4 is ON, a period during which the driving signal to the group Gr.5 is ON, a period during which the driving signal to the group Gr.6 is ON, a period during which the driving signal to the group Gr.7 is ON and a period during which the driving signal to the group Gr.8 is ON are called a first period P1, a second period P2, a third period P3, a fourth period P4, a fifth period P5, a sixth period P6, a seventh period P7 and an eighth period P8, respectively.

In the present exemplary embodiment, the second period P2 and the seventh period P7 are set longer than the third period P3, the fourth period P4, the fifth period P5 and the sixth period P6. Moreover, the first period P1 and the eighth period P8 are set longer than the second period P2 and the seventh period P7. Note that, in this example, the third period P3, the fourth period P4, the fifth period P5 and the sixth period P6 are set to have the same length, the second period P2 and the seventh period P7 are set to have the same length, and further, the first period P1 and the eighth period P8 are set to have the same length.

When such driving signals are supplied to the respective groups Gr.1 to Gr.8, the light intensity of each of the groups Gr.1 and Gr.8 located at the respective first-scan-direction edge parts becomes larger than that of each of the groups Gr.2 to Gr.7 located inside the groups Gr.1 and Gr.8. Moreover, the light intensity of each of the groups Gr.2 and Gr.7 becomes larger than that of each of the groups Gr.3 to Gr.6 located inside the groups Gr.2 and Gr.7, namely at the first-scan-direction center part.

Consequently, even when this configuration is employed, at the reading position R, the light intensity in the edge parts in the first scan direction Y is increased and thus becomes larger than that in the center part.

Although the guiding unit 70 is formed of the light-guiding member 71 and the diffusing member 72 in the first to fourth exemplary embodiments, the present invention is not limited to this. For example, the guiding unit 70 may be formed of the light-guiding member 71 having the output face 71b on which asperities are directly formed.

Although a white LED is used as each of the light emitting elements 52 in the first to fourth exemplary embodiments, the present invention is not limited to this. For example, an organic Electro-Luminescence (EL) element or the like may be used as each of the light emitting elements 52.

Furthermore, although the light emitting element array 53 is formed of the light emitting elements 52 arranged in line in the first scan direction Y on the board 51 in the first to fourth exemplary embodiments, the present invention is not limited to this. For example, the light emitting elements 52 may be arranged in a zigzag pattern on the board 51.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
a light emitting element array that includes a plurality of light emitting elements arranged in line in a first scan direction of a document;
a guiding unit that guides light entering from the light emitting element array, and that emits the light toward a reading position of the document while diffusing the light;
a light receiving unit that receives reflected light from the reading position irradiated with the light from the light emitting element array through the guiding unit; and
a scan unit that moves the reading position of the document in a second scan direction, the reading position being a position read by the light receiving unit,
wherein
the guiding unit includes an input face for receiving the light from the light emitting element array, and an output face for emitting the light,
a length in the first scan direction of the output face is set larger than a length of the document located at the reading position, and positions of edges in the first scan direction of the output face are located outside respective positions of edges in the first scan direction of the document,
a length in the first scan direction of the input face is set smaller than the length in the first scan direction of the output face, and positions of edges in the first scan direction of the input face are located inside the respective positions of edges in the first scan direction of the output face; and the length in the first scan direction of the input face is set larger than a length of the light emitting element array, and positions of edges in the first scan direction of the light emitting element array are located inside the respective positions of edges in the first scan direction of the input face, and
the output face has asperities that are formed at an interval smaller than an interval at which the plurality of light emitting elements are arranged in the light emitting element array.

2. The image reading apparatus according to claim 1, wherein
the guiding unit includes an input face for receiving the light from the light emitting element array, and an output face for emitting the light, and
the output face has asperities that are formed at an interval smaller than an interval at which the plurality of light emitting elements are arranged in the light emitting element array.

3. The image reading apparatus according to claim 2, further comprising an image forming part that is provided on a light path extending from the reading position to the light receiving unit, and that forms an image of the reflected light from the reading position, on the light receiving unit, wherein the asperities in the output face are formed less deeply in edge parts in the first scan direction than in a center part in the first scan direction.

4. The image reading apparatus according to claim 1, further comprising an image forming part that is provided on a light path extending from the reading position to the light receiving unit, and that forms an image of the reflected light from the reading position, on the light receiving unit, wherein the asperities in the output face are formed less deeply in edge parts in the first scan direction than in a center part in the first scan direction.

5. The image reading apparatus according to claim 3, wherein convex portions of the asperities in the output face are formed widely in the edge parts in the first scan direction than in the center part in the first scan direction.

6. The image reading apparatus according to claim 4, wherein convex portions of the asperities in the output face are formed widely in the edge parts in the first scan direction than in the center part in the first scan direction.

7. A linear light source unit comprising:
a light emitting element array that includes a plurality of light emitting elements arranged in line; and
a guiding unit including: an input face that is formed along the light emitting element array so as to face the light emitting element array and that receives light from the light emitting element array; and an output face that is formed so as to face the input face and that emits the light entering through the input face while diffusing the light, wherein
the guiding unit includes an input face for receiving the light from the light emitting element array, and an output face for emitting the light,
a length in the first scan direction of the output face is set larger than a length of the document located at the reading position, and positions of edges in the first scan direction of the output face are located outside respective positions of edges in the first scan direction of the document,
a length in the first scan direction of the input face is set smaller than the length in the first scan direction of the output face, and positions of edges in the first scan direction of the input face are located inside the respective positions of edges in the first scan direction of the output face; and the length in the first scan direction of the input face is set larger than a length of the light emitting element array, and positions of edges in the first scan direction of the light emitting element array are located inside the respective positions of edges in the first scan direction of the input face, and
the output face has asperities that are formed at an interval smaller than an interval at which the plurality of light emitting elements are arranged in the light emitting element array.

8. The linear light source unit according to claim 7, wherein
a length of the input face in an arrangement direction of the light emitting element array is set larger than a length of the light emitting element array, and edges of the input face in the arrangement direction are located outside respective edges of the light emitting element array in the arrangement direction, and
a length in an arrangement direction of the output face is set larger than the length of the input face, and edges of the output face in the arrangement direction are located outside the respective edges of the input face in the arrangement direction.

* * * * *